United States Patent [19]
Baulier et al.

[11] Patent Number: 6,157,707
[45] Date of Patent: Dec. 5, 2000

[54] AUTOMATED AND SELECTIVE INTERVENTION IN TRANSACTION-BASED NETWORKS

[75] Inventors: Gerald Donald Baulier, Stanhope; Michael H. Cahill, New Providence; Virginia Kay Ferrara, Middletown; Diane Lambert, Berkeley Heights, all of N.J.

[73] Assignee: Lucent Technologies Inc., Murray Hill, N.J.

[21] Appl. No.: 09/283,673

[22] Filed: Apr. 2, 1999

Related U.S. Application Data

[60] Provisional application No. 60/080,006, Apr. 3, 1998.

[51] Int. Cl.⁷ .................................................. H04M 3/00
[52] U.S. Cl. ........................ 379/189; 379/88.01; 379/112
[58] Field of Search .............................. 379/189, 88.01, 379/112

[56] References Cited

U.S. PATENT DOCUMENTS

| | | | |
|---|---|---|---|
| 4,363,102 | 12/1982 | Holmgren et al. | 364/513 |
| 4,799,255 | 1/1989 | Billinger | 379/189 |
| 5,345,595 | 9/1994 | Johnson et al. | 455/33.1 |

(List continued on next page.)

FOREIGN PATENT DOCUMENTS

| | | | |
|---|---|---|---|
| 2 303 275 | 2/1997 | United Kingdom | H04Q 7/38 |
| WO 96/08907 | 3/1996 | WIPO . | |

OTHER PUBLICATIONS

Hanagandi, V. et al., "Density–Based Clustering and Radial Basis Function Modeling to Generate Credit Card Fraud Scores", *Proceedings of the IEEE/IAFE Conference on Computational Intelligence For Financial Engineering*, Mar. 24, 1996, pp. 247–251.

Baulier, G. D. et al. "Sunrise: A Real–Time Event–Processing System", *Bell Labs Technical Journal*, Jan.–Mar. 1998, pp. 3–18.

Fawcett, T. et al., "Adaptive Fraud Detection", *Data Mining and Knowledge Discovery* (1997), pp. 291–316.

Ezawa, K. J. et al., "Knowledge Discovery in Telecommunication Services Data using Bayesian Network Models", KDD–95, pp. 100–105.

U.S. patent application Ser. No. 09/276339 (Baulier 2–2–1–1–9–1–46–1).

U.S. patent application Ser. No. 09/283672 (Baulier 1–1–1–4).

*Primary Examiner*—Creighton Smith
*Attorney, Agent, or Firm*—Gregory J. Murgia

[57] ABSTRACT

Fraud losses in a communication network are substantially reduced by automatically and selectively invoking one or more authentication measures based on a fraud score that indicates the likelihood of fraud for that particular call or previously scored calls. By selectively invoking authentication on only those calls that are suspected or confirmed to be fraudulent, fraud prevention can be achieved in a way that both reduces fraud losses and minimizes disruptions to legitimate subscribers. Using telecommunication fraud as an example, a subscriber is registered in a system by collecting data on that subscriber based on the particular authentication method being used, such as shared knowledge (e.g., passwords), biometric validation (e.g., voice verification), and the like. Once registered, the authentication function for the subscriber's account is activated and subsequent calls are then scored for the likelihood of fraud during the call setup request phase. Fraud scoring estimates the probability of fraud for each call based on the learned behavior of an individual subscriber and the learned behavior of fraud perpetrators. If fraud is not suspected based on the fraud score, then normal call processing can resume without the need for authentication. If fraud is suspected based on the fraud score, then the system automatically invokes authentication. If authentication indicates suspicion of fraud, e.g., voice prints do not match, then the call may be either be blocked or referred for other appropriate prevention measures, e.g., intercepted by an operator. If fraud is not indicated by authentication, then normal call processing may resume.

21 Claims, 5 Drawing Sheets

U.S. PATENT DOCUMENTS

| | | | |
|---|---|---|---|
| 5,357,564 | 10/1994 | Gupta et al. | 379/188 |
| 5,375,244 | 12/1994 | McNair | 395/725 |
| 5,448,760 | 9/1995 | Frederick | 455/56.1 |
| 5,465,387 | 11/1995 | Mukherjee | 455/26.1 |
| 5,495,521 | 2/1996 | Rangachar | 379/95 |
| 5,502,759 | 3/1996 | Cheng et al. | 379/88 |
| 5,504,810 | 4/1996 | McNair | 379/189 |
| 5,506,893 | 4/1996 | Buscher | 379/114 |
| 5,566,234 | 10/1996 | Reed et al. | 379/188 |
| 5,602,906 | 2/1997 | Phelps | 379/114 |
| 5,623,539 | 4/1997 | Bassenyemukasa et al. | 379/88 |
| 5,627,886 | 5/1997 | Bowman | 379/111 |
| 5,675,704 | 10/1997 | Juang et al. | 395/2.55 |
| 5,677,989 | 10/1997 | Rabin et al. | 395/2.55 |
| 5,706,338 | 1/1998 | Relyea et al. | 379/189 |
| 5,768,354 | 6/1998 | Lange et al. | 379/189 |
| 5,819,226 | 10/1998 | Gopinathan et al. | 705/1 |

AUTOMATED AND SELECTIVE INTERVENTION IN TRANSACTION-BASED NETWORKS

CROSS-REFERENCE TO RELATED APPLICATIONS

This application claims the benefit of U.S. Provisional Application Serial No. 60/080,006 filed on Apr. 3, 1998, which is herein incorporated by reference. This application is also related to U.S. application Ser. No. 09/283,672 filed Apr. 1, 1999, which is incorporated by reference herein.

TECHNICAL FIELD

This invention relates generally to transaction-based networks and, more specifically, to an automated approach for selectively invoking processes in transaction-based networks based on automated analysis of usage such as, for example, selectively invoking automated authentication mechanisms based on analysis of usage to determine the likelihood of fraud in communication networks.

BACKGROUND OF THE INVENTION

Fraudulent use of communication networks is a problem of staggering proportions. Using telecommunication networks as an example, costs associated with fraud are estimated at billions of dollars a year and growing. Given the tremendous financial liability, the telecommunication industry continues to seek ways for reducing the occurrence of fraud while at the same time minimizing disruption of service to legitimate subscribers.

Although there are many forms of telecommunication fraud, two of the most prevalent types or categories of fraud in today's networks are theft-of-service fraud and subscription fraud. For example, theft-of-service fraud may involve the illegitimate use of calling cards, cellular phones, or telephone lines, while subscription fraud may occur when a perpetrator who never intends to pay for a service poses as a new customer. Subscription fraud has been particularly difficult to detect and prevent because of the lack of any legitimate calling activity in the account that could otherwise be used as a basis for differentiating the fraudulent activity. In either case, losses attributable to these types of fraud are a significant problem.

Many companies boast of superior fraud detection in their product offerings; however, the fact remains that a comprehensive fraud management system does not exist which addresses the operational and economic concerns of service providers and customers alike. For example, a common disadvantage of most systems is that detection of fraud occurs after a substantial amount of fraudulent activity has already occurred on an account. Moreover, some fraud prevention measures implemented in today's systems, which are based solely on inaccurate detection mechanisms, can be quite disruptive to the legitimate customer. As a result, customer "churn" may result as customers change service providers in search of a more secure system.

In general, the shortcomings of prior systems are readily apparent in terms of the amount of time that is required to detect and respond to fraud. For example, fraud detection based on customer feedback from monthly bills is not an acceptable approach to either service providers or customers. Automated fraud detection systems based on "thresholding" techniques are also not particularly helpful in managing fraud on a real-time or near real-time basis. For example, thresholding typically involves aggregating traffic over time (e.g., days, weeks, months), establishing profiles for subscribers (e.g., calling patterns), and applying thresholds to identify fraud. These systems are not viewed as being particularly effective because legitimate users can generate usage that exceeds the thresholds and the amount of fraud that can occur prior to detection and prevention is high (see, e.g., U.S. Pat. No. 5,706,338, "Real-Time Communications Fraud Monitoring System" and U.S. Pat. No. 5,627,886, "System and Method for Detecting Fraudulent Network Usage Patterns Using Real-Time Network Monitoring").

Although speed in detecting fraud may be improved by using technologies such as neural networking, statistical analysis, memory-based reasoning, genetic algorithms, and other data mining techniques, improved fraud detection alone does not completely solve the problem. In particular, even though systems incorporating these techniques may receive and process individual call data on a near real-time basis in an attempt to detect fraud, these systems still do not respond to the detected fraud on a real-time or near real-time basis. In one example, a system may generate an alert to an investigator in a fraud, network monitoring or operations center. However, an alert becomes part of an investigation queue and will generally not be examined or acted upon immediately, thereby resulting in a significant amount of latency in responding to the detected fraud. Because of the reactive nature of these systems in responding to detected fraud, a considerable amount of financial loss is still incurred by service providers and customers after the alert is generated. Furthermore, automated prevention based on inaccurate detection will result in the disruption of service to legitimate subscribers.

Various forms of authentication-based systems have also been proposed for use in combating fraud. Voice verification is one such authentication technique in which a caller's voice sample is compared with a previously stored voice print. Although voice verification may meet some of service providers' requirements for reducing fraud, the prior art systems implementing this type of authentication technique have significant disadvantages in terms of the disruption in service to legitimate subscribers. In particular, interrupting each call during call setup to perform voice verification is a nuisance to legitimate subscribers and an unnecessary waste of call processing and fraud prevention resources. Furthermore, this type of authentication scheme can introduce a substantial amount of costs and unnecessary delay in processing calls in the network.

One specific example of a fraud prevention system employing voice verification is described in U.S. Pat. No. 5,623,539. In this example, a line is constantly monitored, transparent to the users, and voice signal analysis is used to determine whether at least one participant in the telephone conversation is legitimate. More specifically, voice signal analysis is used to segregate speech information of the parties and compare this information with stored voice print information. In addition to the above shortcomings, this system is also highly impractical both in terms legal and social aspects (e.g., invasion of privacy) as well as technical and operational issues (e.g., activated all the time, calls must already be in progress, etc.).

Another example of an authentication-based system is the Roamer Verification Reinstatement (RVR) feature in wireless networks. Some RVR implementations use voice verification when a caller attempts to use service outside of his or her home calling area. Although this authentication technique is less intrusive than the previous example, RVR cannot effectively address fraudulent use of the system within the home area because it is based on initial startup conditions (e.g., outside home area) instead of some form of fraud scoring.

SUMMARY OF THE INVENTION

Fraud losses in a communication network are substantially reduced according to the principles of the invention by automatically and selectively invoking one or more authentication measures on a particular call as a function of scoring calls for the likelihood of fraud. By selectively invoking authentication on only those calls that are suspected or confirmed to be fraudulent, fraud prevention can be achieved in a way that reduces fraud losses, reduces costs, and minimizes disruptions to legitimate subscribers. Moreover, selective authentication based on fraud scoring results in a more efficient use of call processing and fraud management resources.

In one illustrative embodiment for reducing telecommunication fraud, a subscriber is registered in a system by collecting data on that subscriber based on the particular authentication method being used in the system. For example, the data to be collected for shared knowledge-type authentication may be passwords, while a voice print may be collected for a voice verification-type authentication. Once registered, the authentication function for the subscriber's account must be activated. By way of example only, activation of authentication may be based on input from an integrated fraud management system which recommends authentication based on analysis of a suspected fraud case and/or call detail information or activation may be based on provisioning functions within the network. Subsequent calls are then scored for the likelihood of fraud during the call setup request phase. In general, fraud scoring estimates the probability of fraud for each call based on the learned behavior of an individual subscriber and the learned behavior of fraud perpetrators. If the usage is not indicative of fraud based on the analysis and the resulting fraud score, then normal call processing can resume without the need for authentication. If fraud is suspected based on the fraud score, then the system automatically invokes authentication. If authentication indicates suspicion of fraud, e.g., voice prints do not match, then the call may be either blocked or referred for other appropriate prevention measures, e.g., intercepted by operator or customer service representative. If fraud is not indicated by authentication, then normal call processing may resume.

In sum, selective authentication according to the principles of the invention can be invoked on either a per-call or per-account basis, that is, based on current call score or based on a previous fraud case being managed by an integrated fraud management system.

BRIEF DESCRIPTION OF THE DRAWING

A more complete understanding of the present invention may be obtained from consideration of the following detailed description of the invention in conjunction with the drawing, with like elements referenced with like reference numerals, in which.

DETAILED DESCRIPTION OF THE INVENTION

Although the illustrative embodiments described herein are particularly well-suited for managing fraud in a telecommunication network, and shall be described in this exemplary context, those skilled in the art will understand from the teachings herein that the principles of the invention may also be employed in other non-telecommunication transaction-based networks. For example, the principles of the invention may be applied in networks that support on-line credit card transactions, internet-based transactions, and the like. Consequently, references to "calls" and "call detail records" in a telecommunication example could be equated with "transactions" and "transaction records", respectively, in a non-telecommunication example, and so on. Moreover, although the inventive principles are described in the context of fraud prevention systems in a telecommunications network, wherein automated authentication mechanisms are selectively invoked based on analysis of usage to determine the likelihood of fraud, the principles of the invention can be applied to any type of automated approach for selectively invoking processes in transaction-based networks based on automated analysis of usage. Accordingly, the embodiments shown and described herein are only meant to be illustrative and not limiting.

Figure 1:
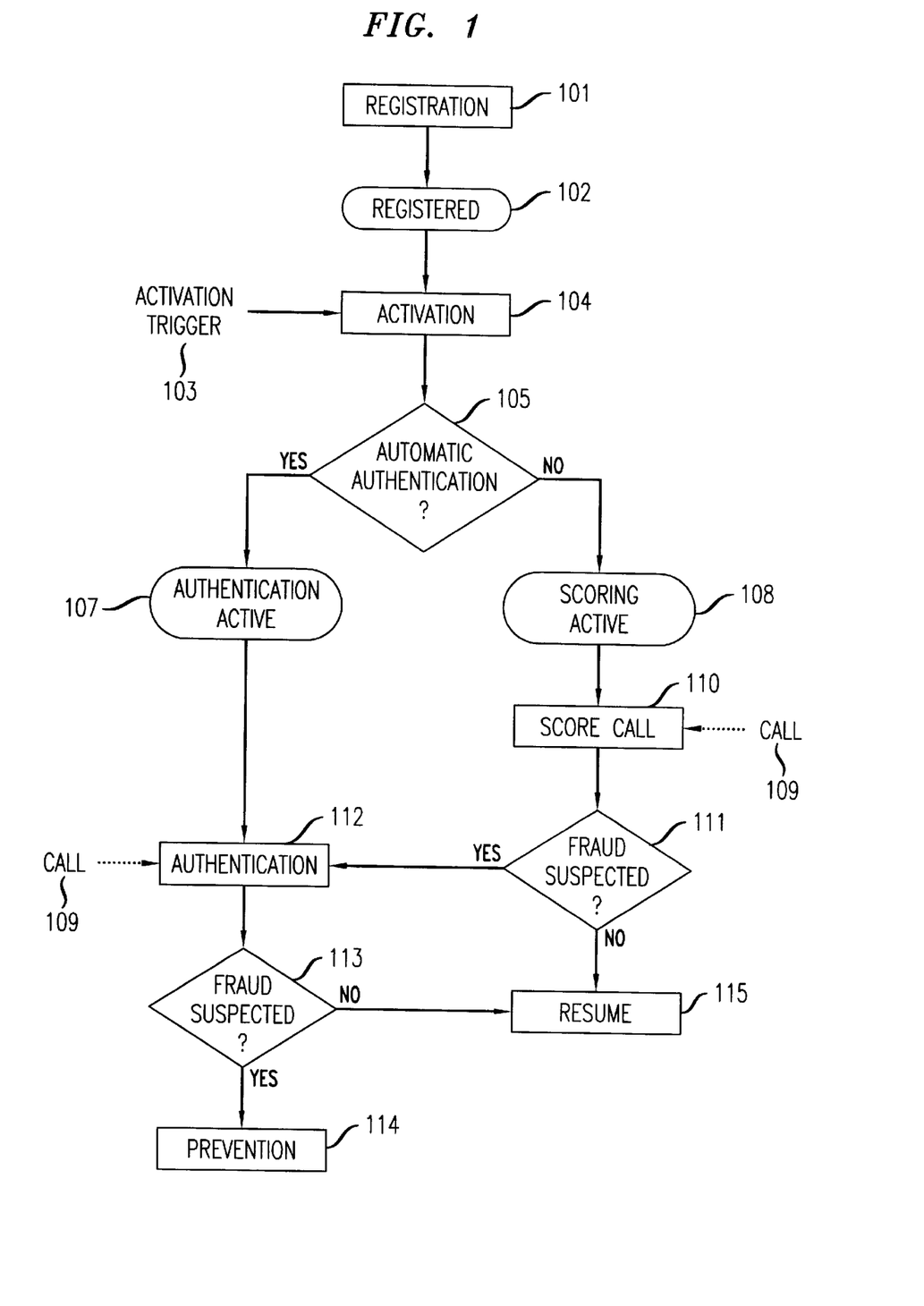
FIG. 1 is a simplified flowchart of the method according to one illustrative embodiment of the invention.

FIG. 1 shows an exemplary method for preventing fraud in a communication network according to one embodiment of the invention. In general, registration step 101 involves the collection of data that is needed to support the particular authentication method being used in the system. As previously described, the particular authentication technique may be a shared knowledge type (e.g., passwords) or biometric validation type (e.g., speaker verification, retinal scanning, fingerprinting, etc.). As such, the registration step 101 would involve the collection of appropriate data such as a voice print if speaker verification is used for authentication, passwords or passcodes if shared knowledge authentication is used, and so on. Furthermore, the data collected in registration step 101 may be unique for a single subscriber or may support multiple legitimate subscribers associated with the account.

For a more detailed description of some exemplary authentication techniques which may be used in conjunction with the principles of the invention, see, e.g., U.S. Pat. No. 5,502,759, U.S. Pat. No. 5,675,704, U.S. Pat. No. 4,363,102, and U.S. Pat. No. 5,677,989, each of which is herein incorporated by reference in its entirety. It should be noted, however, that these exemplary authentication techniques are only meant to be illustrative and not limiting in any way. As such, many other authentication techniques and systems suitable for use with the present invention will be apparent to those skilled in the art and are contemplated by the teachings herein.

By way of example, registration 101 may be invoked as a result of establishment of a new account or as a result of changes in the account that are monitored by an external process. Moreover, the data needed for authentication may be collected as a result of a subscriber dialing a registration number that connects to an authentication server or platform, for example. In this case, the registration process (step 101) would be carried out by the authentication server or platform. Alternatively, data needed for authentication may be collected by an external system, in which case, provisioning functions in the network would invoke the registration process (step 101) and provide the required data.

After registration is completed in step 101, the authentication function enters registered state 102 and is then available for use on that subscriber account. Once in registered state 102, the authentication function on the account must then be activated as shown in step 104. In general, activation triggers 103 may originate from two sources, such as a fraud management system or provisioning functions in a network. In the first example, a fraud management system such as that disclosed in related U.S. application Ser. No. 09/283,672, the subject matter of which is incorporated by reference herein in its entirety, may be used to trigger the activation of the selective authentication function. Briefly, this fraud management system analyzes cases of suspected fraudulent activity and automatically generates recommendations for responding to the suspected fraud. As such, one of the recommended responses may be to invoke authentication on subsequent calls before allowing those calls to be processed. This type of output from a fraud management system can thus be used as an activation trigger 103 according to the principles of the present invention. It should be noted that the exemplary system described in the aforementioned patent application is only meant to be illustrative and not limiting in any way. Accordingly, output supplied by other fraud management systems could also be used as activation triggers 103. It is important to note that the accuracy (e.g., selectivity) of the authentication scheme is a function of the accuracy of the fraud management system. As such, an accurate fraud management system will result in authentication being invoked in a highly targeted manner.

Provisioning functions in a network may also supply activation trigger 103 to activate the authentication function according to the principles of the invention. More specifically, the authentication function may be activated for a particular account in response to a provisioning request that is implemented for that account in the network. A provisioning request may or may not be based on fraud-related determinations. For example, a service provider may decide that the authentication function should be activated based on a non-payment status in the account. Various techniques for provisioning services and functions within a network, such as a telecommunication network, are well known to those skilled in the art.

When a call is received after activation in step 104, selective authentication can be implemented in one of two ways according to the exemplary embodiment shown in FIG. 1. More specifically, a determination is made in step 105 as to whether authentication should be automatically invoked regardless of subsequent call scoring. For example, the aforementioned fraud management system may recommend automatic authentication based on a case analysis which shows the likelihood of subscription type fraud. As previously described, subscription fraud occurs where a new account is established for fraudulent use from the outset. As such, the ability to differentiate fraudulent use from legitimate use is complicated by the fact that all calling activity on the newly opened account is fraudulent. By automatically authenticating subsequent calls in this case, a voice print from a suspected subscription fraud perpetrator could be matched with a previously stored voice print associated with a previous known subscription fraud case. Other techniques may also be employed to better detect and prevent subscription type fraud. Moreover, automatic authentication may be desirable for reasons other than for subscription fraud cases. Therefore, the automatic authentication feature gives a service provider further control of when and how authentication is invoked in the system.

Following with the scenario where a determination is made in step 105 to automatically authenticate subsequent calls, appropriate controls are effected so that the system enters active authentication state 107. Subsequent calls 109 are then authenticated in step 112 using the authentication method of choice. If fraud is suspected based on the results of authentication in step 112, then appropriate prevention measures can be implemented as shown in step 114, e.g., block call, route call to attendant, etc. If fraud is not suspected based on the results of authentication, then normal call processing can resume as shown in step 115.

If automatic authentication is not desired as determined in step 105, then appropriate controls are effected so that the system enters active scoring state 108. In this state, all calls 109 will be scored for the likelihood of fraud in step 110. The particular scoring technique used will be described below in more detail. If fraud is suspected based on the fraud score, as shown in step 111, then the system automatically invokes authentication step 112 and subsequent steps as previously described. If fraud is not suspected based on the fraud score, then normal call processing can resume as shown in step 115. By selectively and automatically invoking authentication as a function of call scoring according to the principles of the invention, suspected fraud can be effectively detected, prevented, or otherwise managed while minimizing the intrusion and disruption to legitimate subscribers. Moreover, by triggering selective and targeted authentication as a function of suspicious fraud scores during call processing, service providers can more effectively respond to fraud as it occurs.

Figure 2:
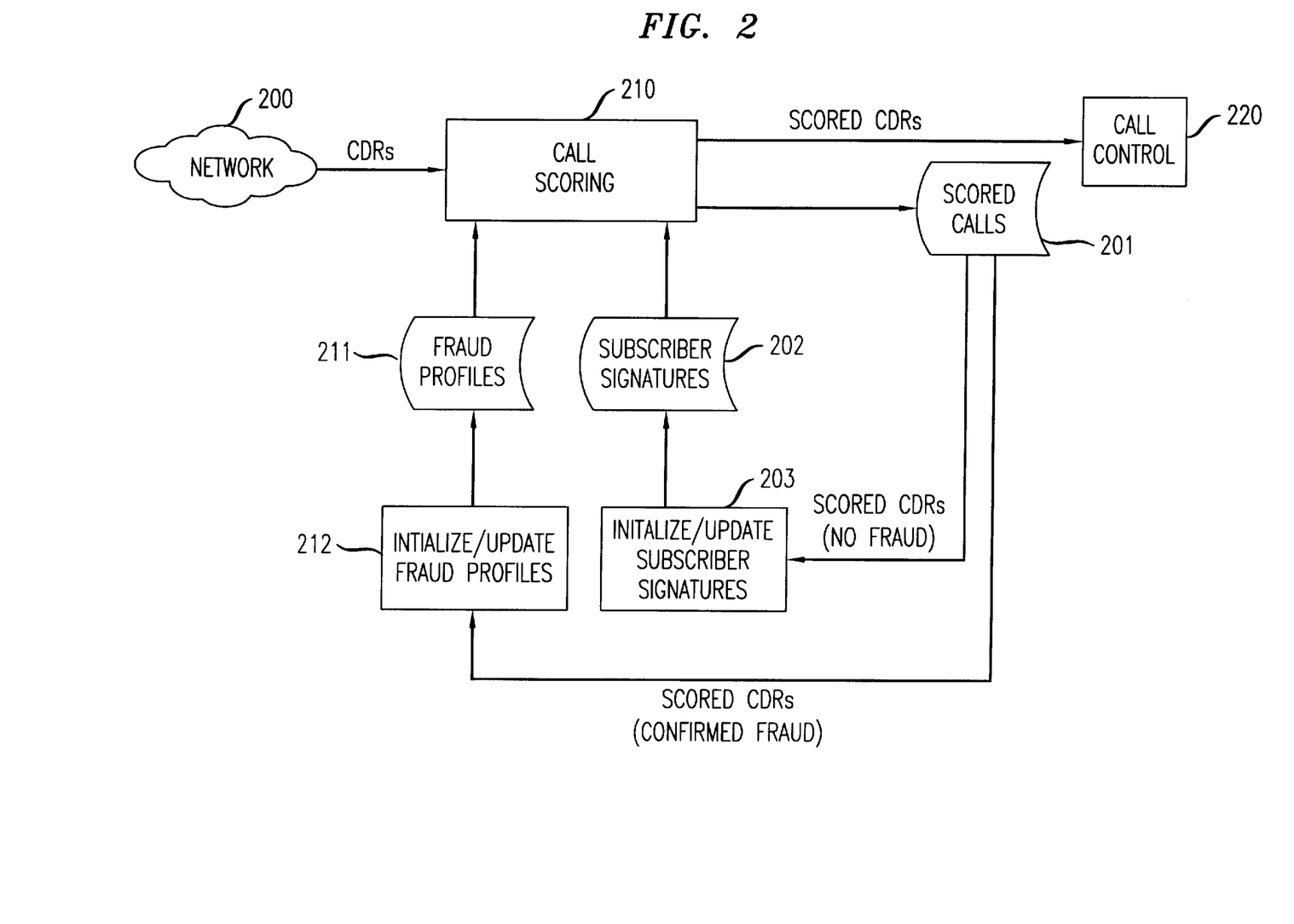
FIG. 2 is a simplified block diagram illustrating how call scoring is implemented according to one embodiment of the invention.

FIG. 2 is a simplified block diagram showing one illustrative embodiment for scoring calls according to step 110 from FIG. 1. In general, call scoring is based on profiling wherein a signature (202) representative of a subscriber's calling pattern and a fraud profile (211) representative of a fraudulent calling pattern are used to determine the likelihood of fraud on a particular call. Scored call information is then stored (201) for later retrieval and used in the iterative and continuous updating process as well as forwarded to call control (220) which will be described in more detail below.

As shown, call detail records are supplied from network 200 to call scoring function 210. The generation of call detail records in telecommunications networks is well known to those skilled in the art. A subscriber's signature may be initialized as shown in block 203 using scored call detail records from calls that have not been confirmed or suspected as fraudulent. Initialization may occur, for example, when a subscriber initially places one or more calls. As further shown in block 203, stored subscriber signatures from block 202 can then be updated using newly scored call detail records from subsequent calls that are not confirmed or suspected as fraudulent. As such, a subscriber's signature can adapt to the subscriber's behavior over time.

It should be noted that initialization of a subscriber's signature can also be based on predefined attributes of legitimate calling behavior which may be defined by historical call records and the like. In this way, subscription fraud can be detected more readily because a legitimate subscriber's signature, even at the very early stages of calling activity, can be correlated with the expected (or predicted) behavior of legitimate callers. As such, any immediate fraudulent calling behavior on a new account, for example, will not provide the sole basis for initializing the subscriber signature.

It should also be noted that a subscriber signature may monitor many aspects of a subscriber's calling behavior including, but not limited to: calling rate, day of week timing, hour of day timing, call duration, method of billing, geography, and so on. Consequently, a signature may be derived from information that is typically contained within the call detail records, such as: originating number; terminating number; billed number; start time and date; originating location; carrier selection; call waiting indicators; call forwarding indicators; three-way calling/transfer indicators; operator assistance requests; and network security failure indicators, to name a few. The particular elements to be used for establishing and updating a subscriber signature may depend on the type of network (e.g., wireline, wireless, calling card, non-telecommunication, etc.), the particular scoring method being used, as well as other factors that would be apparent to those skilled in the art.

Generally, each call will be scored depending on how the call compares to the subscriber's signature retrieved from block 202 and how it compares to a fraud profile retrieved from block 211. By way of example, fraud profiles can be initialized and updated (block 212) using scored call detail records from confirmed or suspected fraudulent calls. In a simplified example, a high fraud score is generated if the call details represent a suspicious deviation from known behavior and a low fraud score is generated if the call details represent highly typical behavior for the subscriber account in question. In addition to providing an overall fraud score as output from call scoring function 210, the relative contributions of various elements of the call to the fraud score should also be included for case analysis purposes, which is described in further detail in related U.S. application Ser. No. 09/283,672. For example, contributions of the following elements may be included for subsequent case analysis: day of week; time of day; duration; time between consecutive calls; destination; use of call waiting; use of call forwarding; use of three-way calling; use of operator services; origination point; use of roaming services (wireless only); number of handoffs during call (wireless only); appearance of network security alert; carrier selection; and use of international completion services. Again, this listing is meant to be illustrative only and not limiting in any way.

Because call scoring is carried out on a customer-specific and call-by-call basis, a more precise fraud score can be obtained that is more indicative of the likelihood of fraud while reducing the amount of false alarms (i.e., "false positives"). Furthermore, to accurately perform call scoring on a call-by-call basis, those skilled in the art will recognize that one suitable implementation would be to execute the above-described functions using a real-time processing platform. One such exemplary real-time processing platform is Lucent Technologies' QTM™ real-time transaction processing platform, which is described in an article by J. Baulier et al., "*Sunrise: A Real-Time Event-Processing Framework*", Bell Labs Technical Journal, Nov. 24, 1997, and which is herein incorporated by reference.

It will be apparent to those skilled in the art that many different call scoring techniques may be suitable for implementing the functionality of call scoring function 210 as described above. In particular, call scoring techniques based on statistical analysis, probabilistic scoring, memory-based reasoning, data mining, neural networking, and other methodologies are known and are contemplated for use in conjunction with the illustrative embodiments of the invention described herein. Some examples of these methods and techniques are described in Fawcett et al., "*Adaptive Fraud Detection*", Data Mining and Knowledge Discovery 1, 291–316 (1997) and U.S. Pat. No. 5,819,226, "*Fraud Detection Using Predictive Modeling*", issued Oct. 6, 1998, each of which is herein incorporated by reference.

Figure 3:
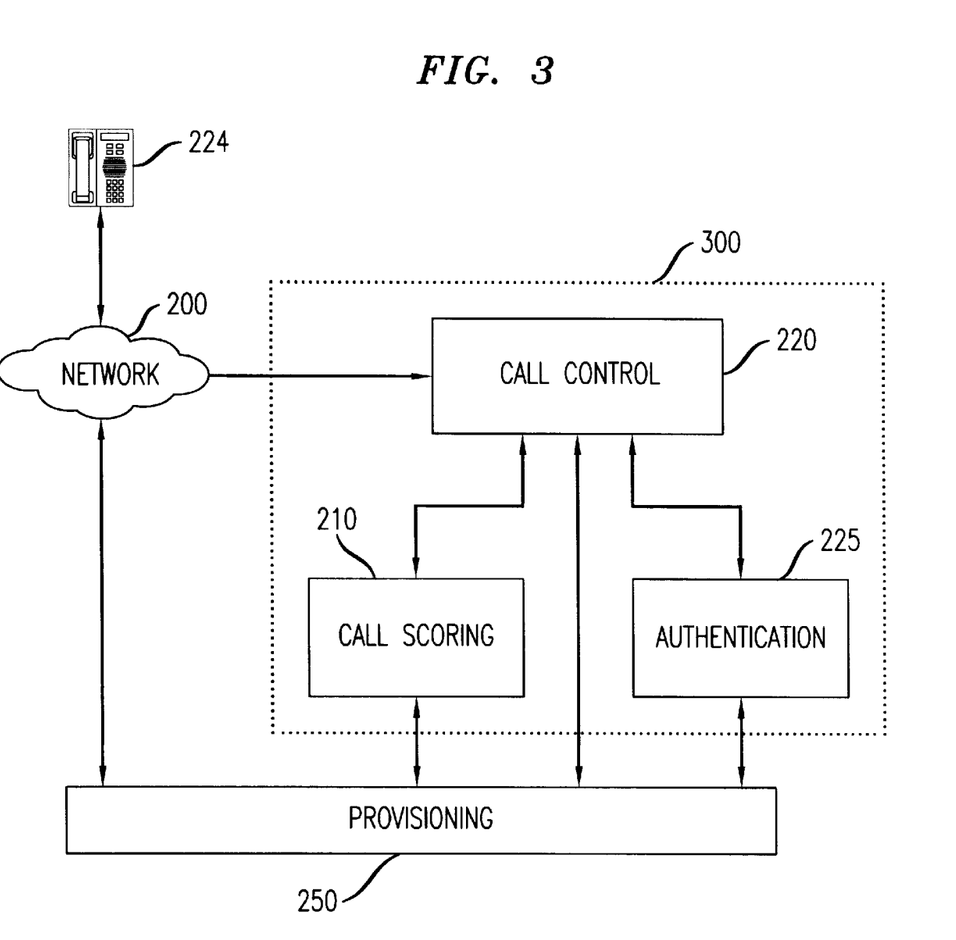
FIG. 3 is a simplified block diagram of a system according to one illustrative embodiment of the invention.

FIG. 3 is a simplified block diagram showing one illustrative embodiment of a system for controlling fraud in a typical telecommunication network according to the principles of the invention. As shown, system 300 includes call control function 220 coupled to call scoring function 210 and authentication function 225. System 300 is further coupled to network 200, which services a number of subscribers, such as subscriber 224. Provisioning function 250 is coupled to and communicates with each of network 200, call control function 220, call scoring function 210, and authentication function 225. It will be appreciated that the functions described herein may be implemented using computer hardware and software programmed to carry out the associated functions and operations.

In operation, origination of a call by subscriber 224 in a telecommunications network 200 will cause several actions to occur. First, a request for call setup is issued to call control 220. Call control 220 carries out several functions in response to the call setup request. For example, call control 220 analyzes the call setup request, conditionally invokes call scoring 210 and/or conditionally invokes authentication 225, and may subsequently complete the call and/or generate appropriate call detail record(s). In particular, call control 220 operates in conjunction with call scoring 210 and authentication 225 to carry out the steps previously described in the flowchart of FIG. 1.

In sum, call scoring function 210, when invoked or otherwise activated, scores calls based on the call detail records supplied by call control function 220 and provides the basis for a decision as to whether authentication needs to be invoked for the particular call. Authentication function 225 receives data about or from user 224 either directly via a connection established by call control 220 or indirectly via services provided by call control 220. The type of data supplied to authentication function 225 will vary depending on the type of authentication method being used, e.g., voice print analysis, other biometric analysis, password, and so on. Provisioning function 250 changes the state of information in call control 220, call scoring 210, and authentication function 225 based on requests generated by any one of those systems or by an external system (not shown). Additionally, provisioning function 250 may be used to implement appropriate actions in conjunction with network 200 for a particular call based on the call scoring and authentication processes.

Figure 4:
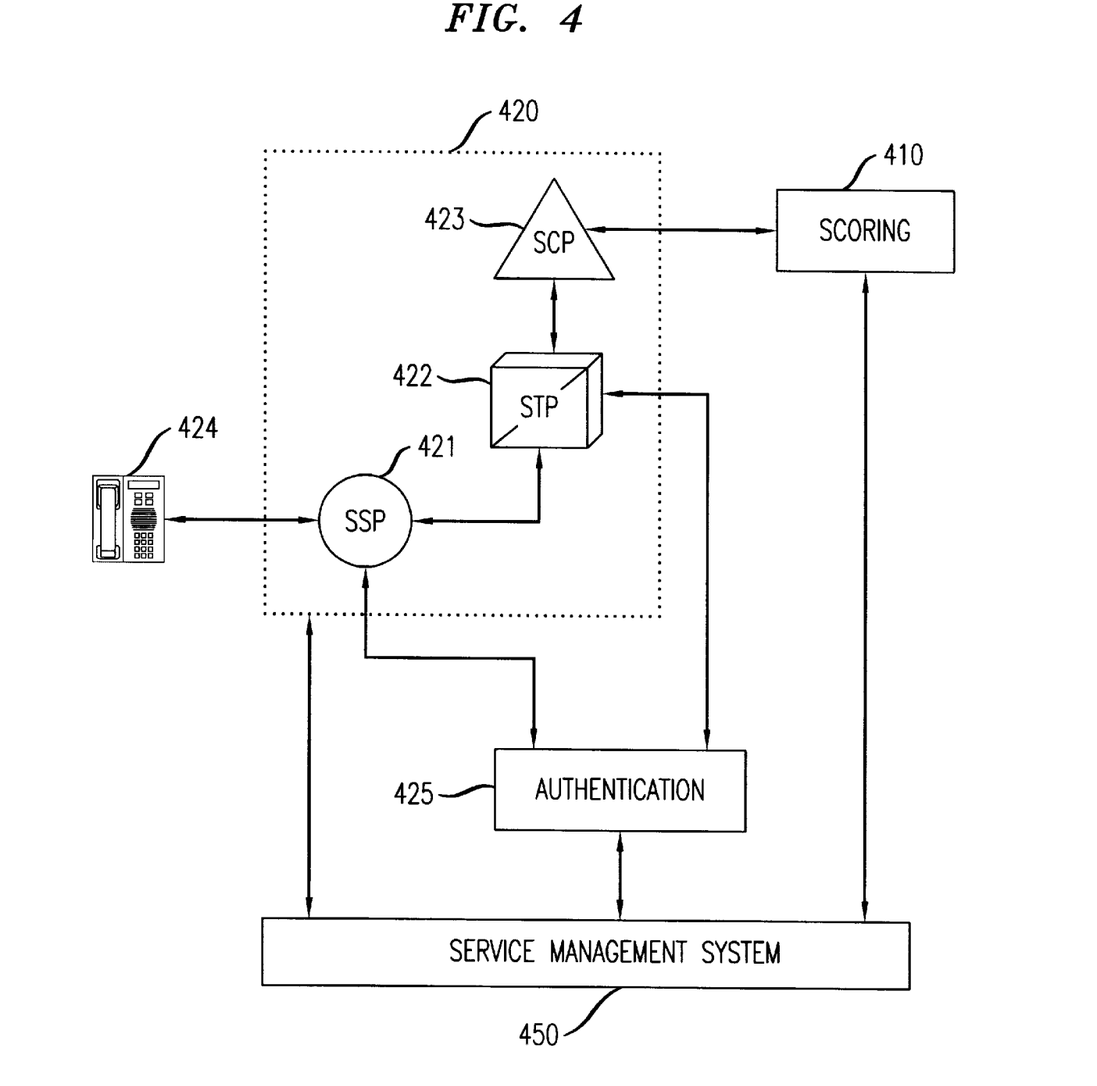
FIGS. 4 and 5 are simplified block diagrams that show exemplary network configurations in which the principles of the invention may be used.
Figure 5:
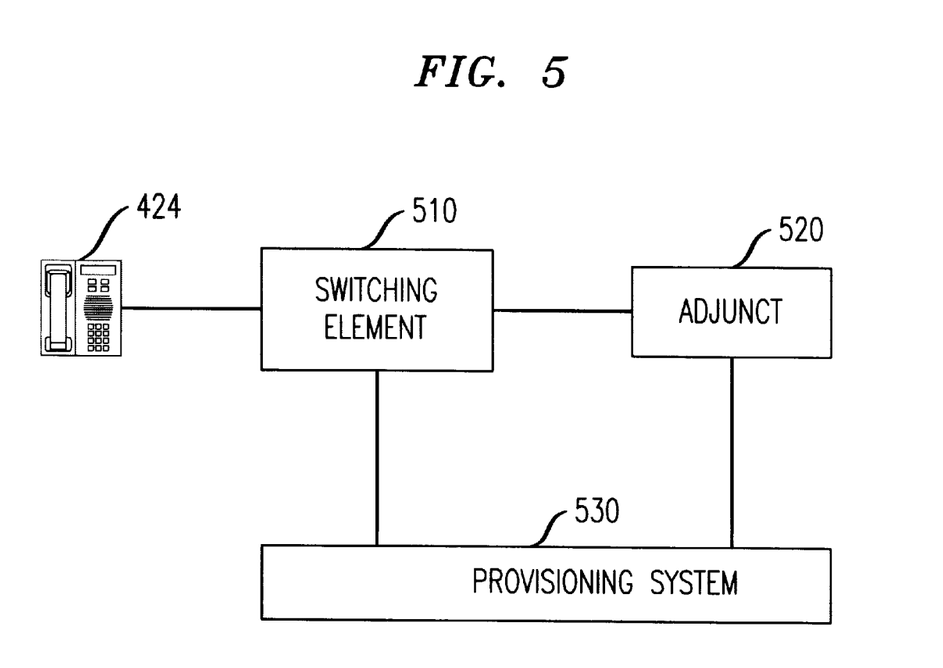

FIGS. 4 and 5 show an Intelligent Network (IN)-based architecture and an adjunct-based architecture, respectively, in which the principles of the invention may be used. It should be noted that the principles of the invention can be used in many different types of network architectures. As such, the exemplary network architectures shown and described herein are meant to be illustrative only and not limiting in any way.

Referring to FIG. 4, user 424 may be supported by any type of customer premise equipment or mobile transmitter. In this illustrative embodiment, call control 420 is implemented in three nodes in the Intelligent Network (IN) architecture, those being Service Switching Point (SSP) 421, Signal Transfer Point (STP) 422, and Service Control Point (SCP) 423. Service Switching Point 421 provides basic analysis of call set-up requests, routes calls, and sends requests for service processing guidance to Service Control Point 423. Service Control Point 423 makes service decisions, requests call scoring support from call scoring function 410, and instructs Service Switching Point 421 to route calls to authentication function 425 when appropriate. Communication among Service Switching Point 421, Service Control Point 423, and, if desired, authentication function 425, is supported by a common channel signaling network in which messages may be routed by one or more of Signal Transfer Points 422. Call scoring function 410 could be implemented in a separate operations system. As such, the interface between call scoring function 410 and call control 420 is Service Control Point 423 via an operations interface capable of call processing speeds and reliability. Authentication function 425 can be supported either in a separate services node, e.g., an authentication server as shown, or within Service Control Point 423. Provisioning is carried out in Service Management System 450.

In one possible adjunct implementation shown in FIG. 5, all call control is implemented within a switching element 510, while fraud management (e.g., scoring) and authentication services are supported out of a common adjunct 520. The interface between switching element 510 and adjunct 520 may be any link supporting call set-up signaling, service signaling and voice trunking, such as the Integrated Services Digital Network (ISDN) Basic Rate Interface (BRI) or Primary Rate Interface (PRI). In this illustrative implementation, switching element 510 provides analysis of call set-up requests, makes service decisions, requests call scoring support from adjunct 520, determines whether to route calls to adjunct 520 for authentication and routes those calls. Adjunct 520 provides call scoring and authentication. Provisioning, again, is carried out in a separate provisioning system 530 that is connected to all elements.

The basic flow described above can be applied to a variety of telecommunications services. One illustrative but not limiting example is calling card. A brief description of the processing performed by typical calling card services in the absence of in-call fraud prevention is first provided to assist in understanding how the principles of the invention can then be applied in the calling card context.

FIG. 4, which provides one of many possible network implementations supporting calling card services, can illustrate both provisioning and call processing. When a new account is opened, information on the account is loaded from service management system 450 into SCP 423. The subscriber 424 of the service is then able to use his/her card. The subscriber 424 dials a call which is interpreted by SSP 421 as requiring additional services. This is usually based on the dialing of the call, such as the dialing of a 0+ prefix or a toll-free number associated with operator services. Through interaction with SSP 421, the subscriber identifies that calling card services are requested and enters his/her card number. The card number is validated by SCP 423, which instructs the SSP 421 to complete the call, re-prompt for card information, route the call to an operator or deny service.

In-call prevention may be applied to this service flow. Again, as an illustrative but not limiting example, consider FIG. 4. When new service on the card is opened, authenticating information is collected either by an external system and loaded by the service management system 450 into authentication 425, or is entered directly by the subscriber into authentication 425. In the latter case, the subscriber is instructed to dial a particular number which is interpreted by call control 420 as a request for connection into the authentication system 425. The authentication system 425 recognizes the call as a registration and collects required information from the subscriber. Once the authentication system is properly loaded, service management system loads the account information in SCP 423 and the service is ready for use.

At some point in the history of the account, scoring 410 will determine that authentication should be activated, based on call detail records. Scoring 410 will issue a request via service management system 450 to activate authentication. In this example, assume that score-based authentication is requested. Once activated, subsequent calls are processed as follows. The subscriber 424 dials a call which is interpreted by SSP 421 as requiring additional services. This is usually based on the dialing of the call, such as the dialing of a 0+ prefix or a toll-free number associated with operator services. Through interaction with SSP 421, the subscriber identifies that calling card services are requested and enters his/her card number. The card number is transmitted to SCP 423 for validation, which also recognizes that scoring and authentication have been activated on this account. While validating the card, SCP 423 also transmits a scoring request to scoring 410 which will respond with an instruction to either authenticate the call, process the call according to SCP validation (without authentication), route the call to an attendant, or deny the call entirely. If the response is to authenticate, the SCP 423 will send an instruction to the SSP 421 to route the call to authentication 425. Authentication will then challenge the subscriber 424 using whatever authentication technique(s) it employs. The result of authentication (pass, fail, ambiguous) is returned to the SCP 423 via the SSP 421. The SCP then decides whether the call should be allowed, denied or routed to an attendant and instructs SSP 421 accordingly. Optionally, the SCP 423 will provide information on authentication to scoring 410 for case management purposes.

It should also be noted that implementation of in-call prevention for calling card services can also be carried out using multiple platforms. Accordingly, various modifications to the implementation details of the principles of the invention based on particular services (e.g., calling card) and particular network configurations will be apparent to those skilled in the art in view of the teachings herein.

As described herein, the present invention can be embodied in the form of methods and apparatuses for practicing those methods. The invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should also be noted that the foregoing merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the drawing may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the drawing are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent to those shown herein.

What is claimed is:

1. A method for reducing fraudulent activity in a telecommunication network, comprising the step of:
   automatically and selectively invoking at least one authentication measure during a call processing state for a particular call as a function of scoring calls for the likelihood of fraud, wherein the at least one authentication measure is selectively invoked based on a fraud score, the fraud score being derived as a function of a legitimate subscriber signature and a fraud signature, such that fraudulent activity in the network is reduced on a targeted basis thereby reducing disruptions to legitimate activity in the network.

2. The method according to claim 1, wherein the at least one authentication measure is selected from the group consisting of voice verification, biometric validation, and shared knowledge-based verification.

3. The method according to claim 1, wherein scoring is done on a call-by-call basis using a real-time transaction processing platform.

4. The method according to claim 1, wherein the fraud score is based on learned behavior of a subscriber comprising the subscriber signature and learned behavior of fraudulent calling activity comprising the fraud signature.

5. The method according to claim 1, wherein the at least one authentication measure is selectively invoked on calls suspected of being fraudulent and calls confirmed to be fraudulent based on the fraud score.

6. A method for controlling a network where transactions occur, comprising the step of:
   automatically and selectively invoking at least one process during a particular transaction based on automated analysis of usage in the network wherein the at least one process is selectively invoked to reduce fraudulent activity in the network on a targeted basis thereby reducing disruptions to legitimate activity in the network.

7. The method according to claim 6, wherein automated analysis of usage in the network includes identifying the likelihood of fraud for transactions occurring in the network.

8. A method for reducing fraudulent activity in a telecommunication network, comprising the steps of:
   registering a subscriber by collecting information on that subscriber, wherein the information corresponds to a prescribed authentication measure;
   activating the prescribed authentication measure for that subscriber's account;
   scoring a call for the likelihood of fraud during a call setup request phase; and
   if fraud is suspected based on the scoring step, automatically and selectively invoking authentication for the call according to the prescribed authentication measure, whereby fraudulent activity in the network is reduced on a targeted basis thereby reducing disruptions to legitimate activity in the network.

9. The method according to claim 8, further comprising the step of, if authentication indicates suspicion of fraud, initiating one or more prescribed call processing measures.

10. The method according to claim 9, wherein the step of initiating one or more prescribed call processing measures is a step selected from the group consisting of blocking the call, terminating the call, and routing the call to an operator.

11. The method according to claim 8, wherein the prescribed authentication measure is voice verification, and wherein the step of registering includes the step of collecting a voice print for the subscriber.

12. The method according to claim 8, wherein the step of activating includes the step of receiving input from an external fraud management system that recommends authentication based on analysis of a suspected fraud case.

13. The method according to claim 8, wherein a fraud score of an individual call is representative of the likelihood of fraud based on the learned behavior of a subscriber comprising a subscriber signature and the learned behavior of fraudulent calling activity comprising a fraud profile.

14. The method according to claim 8, wherein the prescribed authentication measure is biometric validation, and wherein the step of registering includes the step of collecting biometric information for the subscriber.

15. The method according to claim 8, wherein the prescribed authentication measure is shared knowledge-based verification.

16. The method according to claim 8, wherein the step of registering is triggered by an event selected from the group consisting of establishment of a new account and monitored changes to an existing account.

17. The method according to claim 8, wherein the step of activating includes the step of receiving a provisioning request.

18. A system for reducing fraudulent activity in a network, comprising:

means for scoring calls in the network and for generating a fraud score indicative of the likelihood of fraud; and means, responsive to the fraud score for automatically and selectively invoking at least one authentication measure during a call processing state for a particular call, such that fraudulent activity in the network is reduced on a targeted basis thereby reducing disruptions to legitimate activity in the network.

19. The system according to claim 18, wherein the network is an intelligent network (IN) including one or more service switching points (SSPs), one or more signal transfer points (STPs), and one or more service control points (SCPs).

20. The system according to claim 18, wherein the network is an adjunct-based network.

21. A method for reducing fraudulent activity in a telecommunication network, comprising the step of:

responsive to call scoring, automatically and selectively authenticating a call, wherein call scoring provides an indication of the likelihood of fraud as a function of a legitimate subscriber signature and a fraud signature, such that fraudulent activity in the network is reduced on a targeted basis thereby reducing disruptions to legitimate activity in the network.

* * * * *